United States Patent [19]
Ament et al.

[11] Patent Number: 5,954,380
[45] Date of Patent: Sep. 21, 1999

[54] SAFETY ARRANGEMENT FOR A CARGO SPACE OF A MOTOR VEHICLE

[75] Inventors: Eduard Ament, Aichwald; Holger Seel, Aidlingen, both of Germany

[73] Assignee: Baumeister + Ostler GmbH & Co., Aichwald/Aichschiess, Germany

[21] Appl. No.: 09/045,984

[22] Filed: Mar. 19, 1998

[30] Foreign Application Priority Data

Mar. 21, 1997 [DE] Germany .............................. 197 11 868

[51] Int. Cl.$^6$ ...................................................... B60R 5/04
[52] U.S. Cl. .............................................................. 296/24.1
[58] Field of Search ............................................ 296/24.1

[56] References Cited

U.S. PATENT DOCUMENTS

| | | |
|---|---|---|
| 5,288,122 | 2/1994 | Pilhall ..................................... 296/24.1 |
| 5,551,726 | 9/1996 | Ament ..................................... 296/24.1 |
| 5,632,520 | 5/1997 | Butz ......................................... 296/24.1 |
| 5,702,143 | 12/1997 | Shimazaki ............................. 296/24.1 |
| 5,820,187 | 10/1998 | Ament et al. .......................... 296/24.1 |

FOREIGN PATENT DOCUMENTS

| | | |
|---|---|---|
| 4336380A1 | 4/1995 | Germany . |
| 4441610A1 | 5/1996 | Germany . |

Primary Examiner—Gary C. Hoge
Attorney, Agent, or Firm—Evenson, McKeown, Edwards & Lenahan, PLLC

[57] ABSTRACT

Cassette housings are provided for receiving safety nets for separating a cargo space in lateral vehicle-fixed receiving devices radially to the longitudinal axis of the housing. At least one fixing element is applied to the housing and connects the housing in a force-transmitting manner with a vehicle-fixed plane spaced with respect to the receiving devices.

16 Claims, 2 Drawing Sheets

SAFETY ARRANGEMENT FOR A CARGO SPACE OF A MOTOR VEHICLE

BACKGROUND AND SUMMARY OF THE INVENTION

This application claims the priority of 197 11 868.2, filed Mar. 21, 1997, the disclosure of prior German application which is expressly incorporated by reference herein.

The invention relates to a safety arrangement for a cargo space of a motor vehicle having a flexible planar structure which, for an inoperative position, can be rolled up in a housing and, for an operative position which separates the cargo space from a passenger space of the motor vehicle, can be pulled out of the housing, in which case the housing can be positioned on opposite sides in vehicle-fixed receiving devices radially with respect to a longitudinal axis of the housing.

For station wagons, it is generally known to dispose a safety net for separating a cargo space from a passenger space of the station wagon so that it can be rolled up in a housing. The housing itself has a cartridge-shaped design and, at its opposite ends, is positioned in vehicle-fixed receiving devices. The receiving devices are provided approximately at the level of a vehicle side edge in lateral walls of the cargo space. However, particularly in the case of impact loads on the station wagon, the housing can be thrown out of the lateral holding devices whereby the safety function is no longer ensured.

It is an object of the invention to provide a safety arrangement of the initially mentioned type whose safety function also remains ensured during impact loads upon the motor vehicle.

This object is achieved according to preferred embodiments of the invention in that at least one fixing element is applied to the housing which connects the housing in a force-transmitting manner with a vehicle-fixed plane spaced from the receiving devices. This achieves an additional fixing for the housing which, also during impact loads, ensures that the housing is held in the vehicle-fixed receiving devices. The used term of the housing also includes a two-part housing which only consists of two cup-type lateral parts which reach over the opposite sides of a securing shaft for the planar structure and which are connected with one another by way of the securing shaft or other axial connections. By means of the solution according to the invention, the housing is pressed in a force-transmitting manner radially to the longitudinal axis of the housing into a seat in the receiving devices so that also, in the case of high loads upon the motor vehicle, the secure positioning of the housing is maintained.

In a development of preferred embodiments of the invention, the vehicle-fixed plane is arranged at least approximately in the radial alignment of the vehicle-fixed receiving devices. This permits the designing of the at least one fixing element in a simple manner as a tension or pressure element which presses the housing by a corresponding tension load or pressure load into the seat of the receiving devices.

In a further development of preferred embodiments of the invention, a tension belt is provided as the fixing element which can be adjusted in its length and which can be anchored on the vehicle-fixed plane. This is a particularly simple and low-cost development which, because of the length adjustability of the tension belt, can also be used in different vehicle types.

As a further development of preferred embodiments of the invention, a cargo space floor is provided as the vehicle-fixed plane which is provided with at least one anchoring point for fastening the at least one fixing element. Advantageously, already existing cargo space eyes can be used as anchoring points for the fixing element or elements.

Other objects, advantages and novel features of the present invention will become apparent from the following detailed description of the invention when considered in conjunction with the accompanying drawings.

DETAILED DESCRIPTION OF THE DRAWINGS

Figure 1:
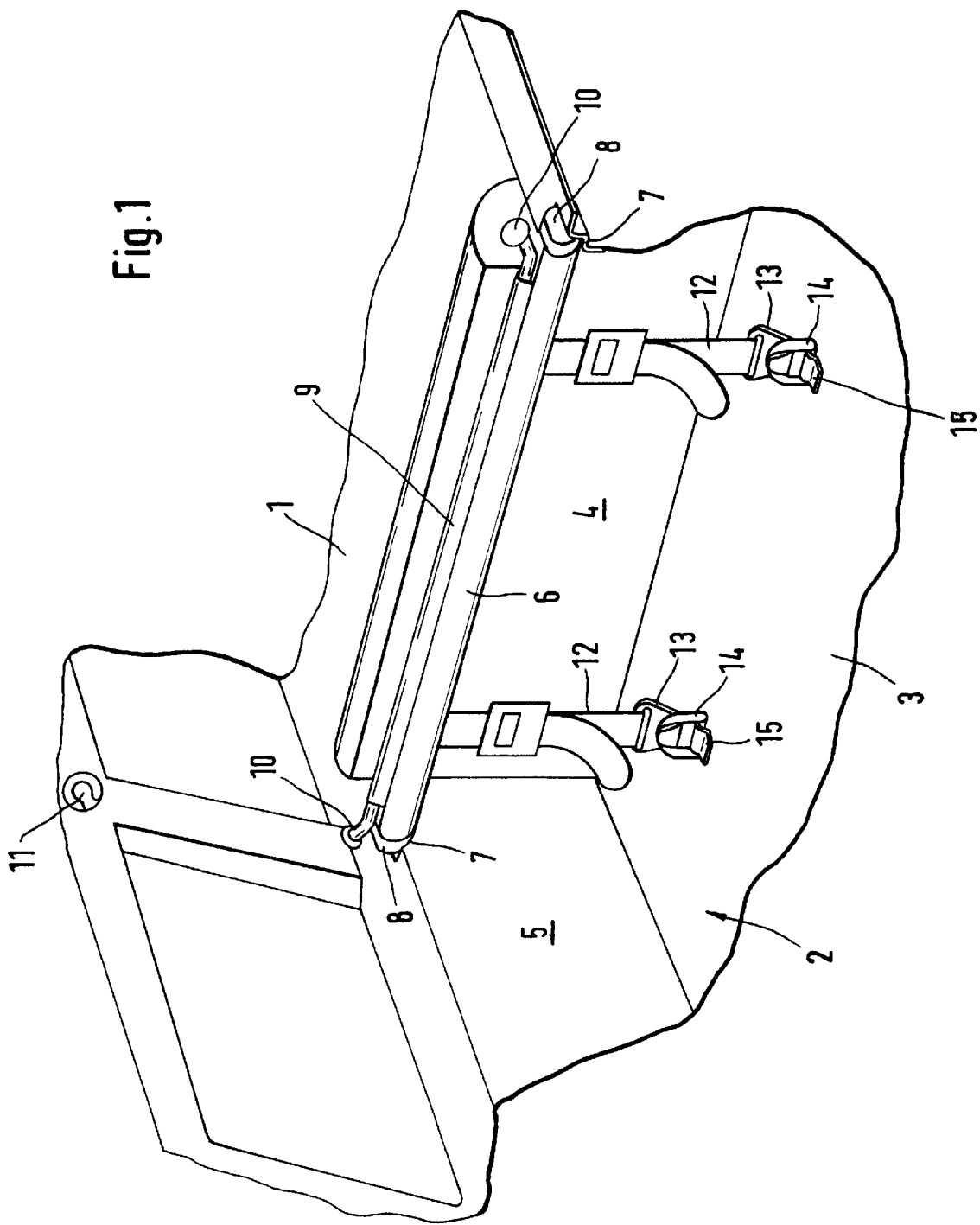
FIG. 1 is a perspective representation of a section of a vehicle interior of a station wagon to whose cargo space a preferred embodiment of a safety arrangement according to the invention is assigned.
Figure 2:
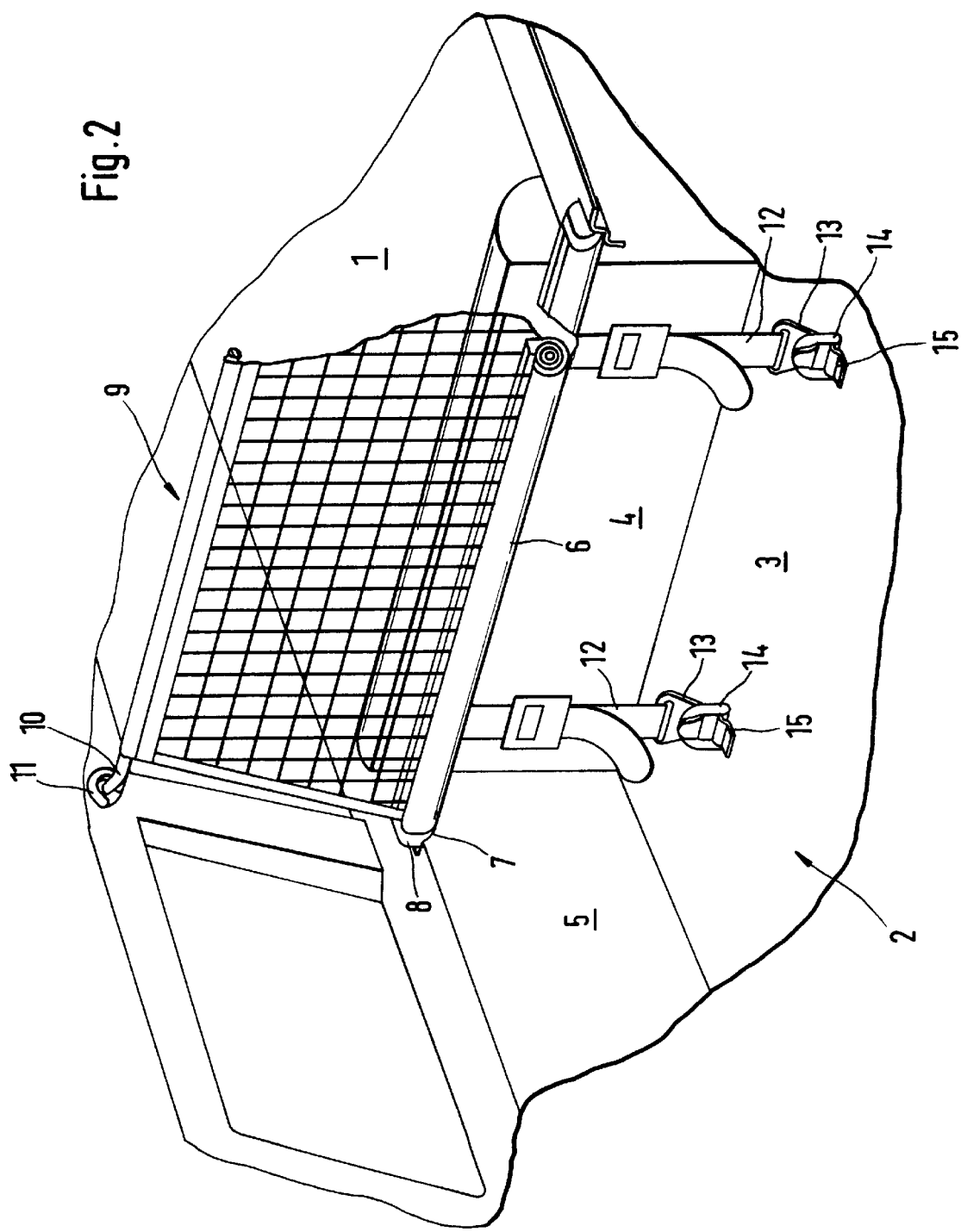
FIG. 2 is a view of the safety arrangement in its pulled-out operative position.

According to FIGS. 1 and 2, a station wagon has a passenger space 1 as well as a cargo space 2 which adjoins this passenger space in the longitudinal direction which together form the interior of the station wagon. The cargo space 2 is provided with a cargo space floor 3 which is bounded in the longitudinal direction of the vehicle toward the front by a rearward side of a rear seat bench 4 and toward the sides by one lateral wall 5 respectively. A rearward-side boundary, which is not shown, of the cargo space 3 is provided by a tailgate or a rear door.

Directly behind the rear seat bench 4, two recesses 7 are provided in the opposite lateral walls 5 of the vehicle interior and each form a receiving device for a cartridge housing 6. The dimensionally stable cartridge housing 6 which extends along the width of the cargo space 2 has a hollow design and is provided on its opposite faces with one lateral part 8 respectively whose outer contours are adapted to the contours of the recesses 7.

In the representation according to FIGS. 1 and 2, the lateral parts 8 of the cassette housing 6 are therefore form-lockingly embedded in the recesses 7. However, in the recesses 7 forming the lateral holding devices for the cassette housing 6, no locking arrangements are provided or only locking arrangements which can transmit only low forces between the vehicle-fixed recesses 7 and the lateral parts 8 so that the cassette housing 6 can be detached without any larger expenditure of force out of the recesses 7 in the upward direction.

In the cassette housing 6 a shaft is coaxially disposed which is not described in detail and onto which a safety net is wound. On its free end, the safety net 9 has a holding rod 10 which extends transversely along the width of the vehicle interior which, on its opposite front ends, is provided with holding pins for the fastening in vehicle-fixed holding receiving devices 11 directly below the ceiling of the vehicle interior.

In its inoperative position, the safety net 9 is therefore according to FIG. 1 pulled through a longitudinal slot provided on the top side of the cassette housing 6 into the cassette housing 6 and is wound onto the securing shaft. In its operative position illustrated in FIG. 2, the safety net 9 is pulled out in the upward direction and is fastened by means of the holding rods 10 in the vehicle-fixed holding receiving devices below the ceiling. In this operative position, the safety net 9 separates the passenger compartment 1 from the cargo space 2.

In order to avoid that, in the case of higher loads upon the lateral holding devices of the cassette housing 6, particularly in the case of lateral impact loads upon the station wagon, the cassette housing 6 is pressed out of the recesses 7, two mutually spaced fixing elements in the form of tension belts 12 are applied to the cassette housing 6 and are anchored at the holding eyes 14 of the cargo space floor 3. In this case, each tension belt 12 has a hook lug 13 which is hung into the corresponding hook eye 14. Both holding eyes 14 are arranged vertically below the cassette housing 6. The holding eyes 14 are fastened on the cargo space floor 3 by means of stop angles 15. Each tension belt 12 has a clamping device, which is not indicated in detail, and by means of which the tension belt 12 can be released or tensioned. The tension belts 12 exercise a tensile load on the cassette housing 6 in the downward direction toward the cargo space floor 3, whereby the lateral parts 8 of the cassette housing 6 are pressed into the seats of the recesses 7 radially with respect to a longitudinal axis of the cassette housing 6.

The holding eyes, which are used as anchoring points, must not necessarily be arranged vertically below the cassette housing. In other embodiments of the invention, these are arranged on different vehicle-fixed planes which are positioned such relative to the lateral holding devices that an additional force load is exercised onto the cassette housing into the lateral holding devices. Advantageous arrangements of the anchoring points are provided on the rearward side of the rear seat bench or in the area of the lateral walls of the cargo space.

For removing the safety arrangement formed by the safety net 9 and the cassette housing 6 from the motor vehicle, the tension belts 12 are released in a simple manner and the hook lugs 13 are unhooked from the holding eyes 14. The safety net 9 is removed from the holding receiving devices 11 and is rolled up in the cassette housing 6. Subsequently, the cassette housing 6 is removed out of the recesses 7 in a simple manner. The new mounting of the safety arrangement takes place correspondingly in the reverse sequence.

Preferred embodiments of the invention are also contemplated for assembly in vehicles other than station wagons, such as large sedans with a cargo space behind the seats.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Safety arrangement for a cargo space of a motor vehicle having a flexible planar structure which, for an inoperative position, can be rolled up in a housing and, for an operative position which separates the cargo space from a passenger space of the motor vehicle, can be pulled out of the housing, the housing being positionable on opposite sides in vehicle-fixed receiving devices radially with respect to a longitudinal axis of the housing, wherein at least one fixing element is applied to the housing and connects the housing in a force-transmitting manner with a vehicle-fixed plane spaced with respect to the receiving devices.

2. Safety arrangement according to claim 1, wherein the vehicle-fixed plane is arranged at least approximately in the radial alignment of the vehicle-fixed receiving devices.

3. Safety arrangement according to claim 1, wherein a tension belt is provided as the fixing element which can be adjusted in its length and which can be anchored on the vehicle-fixed plane.

4. Safety arrangement according to claim 2, wherein a tension belt is provided as the fixing element which can be adjusted in its length and which can be anchored on the vehicle-fixed plane.

5. Safety arrangement according to claim 1, wherein a cargo space floor is provided as the vehicle-fixed plane which is provided with at least one anchoring point for fastening the at least one fixing element.

6. Safety arrangement according to claim 2, wherein a cargo space floor is provided as the vehicle-fixed plane which is provided with at least one anchoring point for fastening the at least one fixing element.

7. Safety arrangement according to claim 3, wherein a cargo space floor is provided as the vehicle-fixed plane which is provided with at least one anchoring point for fastening the at least one fixing element.

8. Safety arrangement according to claim 4, wherein a cargo space floor is provided as the vehicle-fixed plane which is provided with at least one anchoring point for fastening the at least one fixing element.

9. Safety arrangement for a motor vehicle of the type having a passenger space including a passenger seat and a cargo space, comprising:

a flexible planar structure supported at a roll up housing for selective movement between a rolled up stowed position in the roll-up housing and an extended in use position extending out of the roll-up housing and separating the passenger space and cargo space, vehicle fixed receiving devices operable to support the roll-up housing at the vehicle, at least one anchor member attached to vehicle structure remote from said receiving devices, and at least one fixing element which in use connects the roll-up housing in a force transmission manner with said at least one anchor member to thereby press the roll-up housing in position in the receiving devices independently of the position of the flexible planar structure.

10. Safety arrangement for a motor vehicle of the type having a passenger space including a passenger seat and a cargo space, comprising:

a flexible planar structure supported at a roll up housing for selective movement between a rolled up stowed position in the roll-up housing and an extended in use position extending out of the roll-up housing and separating the passenger space and cargo space, vehicle fixed receiving devices operable to support the roll-up housing at the vehicle, and at least one fixing element which in use connects the roll-up housing in a force transmission manner with vehicle structure to thereby hold the roll-up housing in position in the receiving devices independently of the position of the flexible planar structure, wherein the at least one fixing element includes a flexible tension belt.

11. Safety arrangement according to claim 9, wherein the receiving devices are disposed at opposite sides of the cargo space at longitudinal ends of the roll-up housing.

12. Safety arrangement according to claim 10, wherein the receiving devices are disposed at opposite sides of the cargo space at longitudinal ends of the roll-up housing.

13. Safety arrangement according to claim 9, wherein said flexible planar structure is a net which extends in one direction from the roll-up housing when in the in use position, and wherein said at least one fixing element extends from the roll-up housing in a direction other than said one direction.

14. Safety arrangement according to claim 12, wherein said flexible planar structure is a net which extends in one direction from the roll-up housing when in the in use position, and wherein said at least one fixing element extends from the roll-up housing in a direction other than said one direction.

15. Safety arrangement for a motor vehicle of the type having a passenger space including a passenger seat and a cargo space, comprising:

a flexible planar structure supported at a roll up housing for selective movement between a rolled up stowed position in the roll-up housing and an extended in use position extending out of the roll-up housing and separating the passenger space and cargo space, vehicle fixed receiving devices operable to support the roll-up housing at the vehicle, and at least one fixing element which in use connects the roll-up housing in a force transmission manner with vehicle structure to thereby hold the roll-up housing in position in the receiving devices independently of the position of the flexible planar structure, wherein the receiving devices are disposed behind a vehicle back seat, wherein the net extends upwardly in said one direction, and wherein the at least one fixing element extends downwardly from the roll-up housing and is anchored at a floor of the cargo space.

16. Safety arrangement according to claim 15, wherein said at least one fixing element includes a pair of tension belts.

* * * * *